Sept. 24, 1929.   A. R. PRIBIL   1,729,124
SELF LUBRICATING PRESSED STEEL BALL BEARING WHEEL
Filed Sept. 2, 1925    2 Sheets-Sheet 1
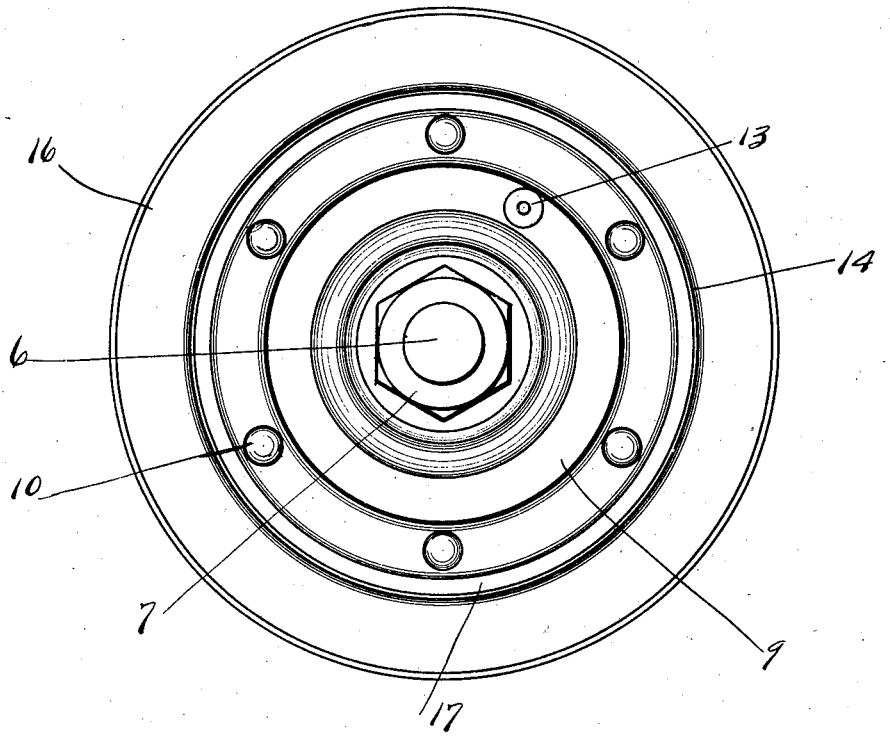
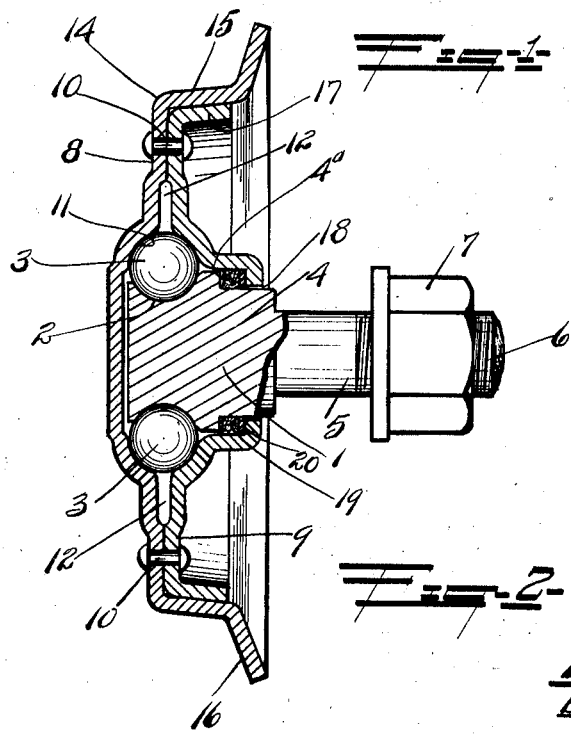
INVENTOR
*Alexis R. Pribil*
By
*Frank C. SCarman*
Attorney.

Sept. 24, 1929.      A. R. PRIBIL      1,729,124
SELF LUBRICATING PRESSED STEEL BALL BEARING WHEEL
Filed Sept. 2, 1925      2 Sheets-Sheet 2
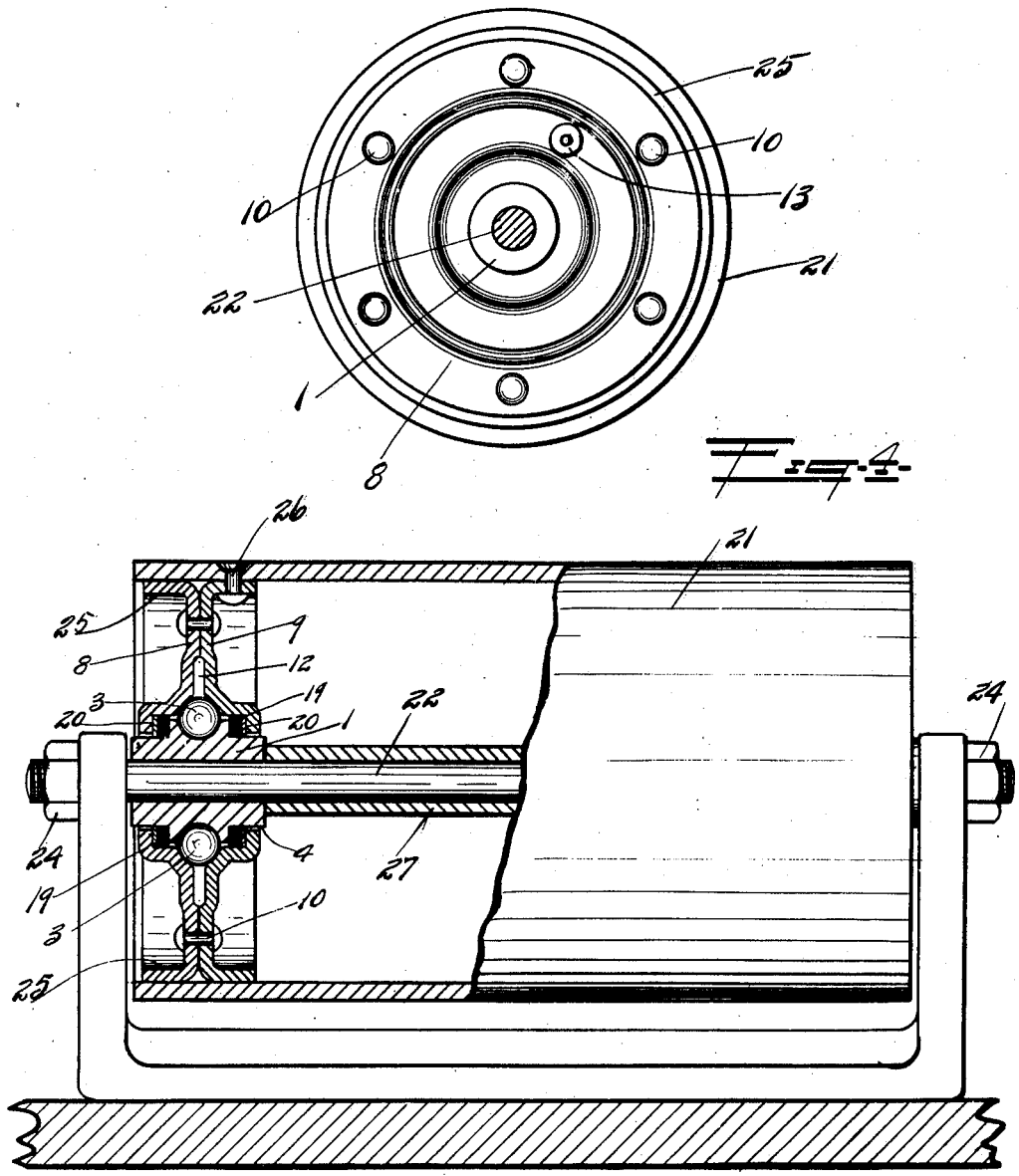
INVENTOR
Alexis R. Pribil.
By
Frank E. Earman.
Attorney.

Patented Sept. 24, 1929

1,729,124

UNITED STATES PATENT OFFICE

ALEXIS R. PRIBIL, OF SAGINAW, MICHIGAN

SELF-LUBRICATING PRESSED-STEEL BALL-BEARING WHEEL

Application filed September 2, 1925. Serial No. 54,064.

This invention relates to pressed steel ball bearing wheels and the like.

One object of the invention is to design a pressed steel ball bearing wheel and provides a lubricating chamber therein.

Another object is to provide a ball bearing wheel which can be formed of stampings insuring economy in manufacture and high speed production.

A further object is to provide a ball bearing wheel which can be used on conveyors, trolleys, idler rollers and in any place requiring a simple, smooth running self-lubricated wheel.

A still further object is to provide a neat and substantial wheel of rigid construction, light in weight and easy to manufacture and assemble.

A further object still is to design a self-lubricating ball bearing wheel and provide means for containing and preventing the escape and leakage of the lubricant.

The above and other objects will appear as the specification progresses, reference being had to the accompanying drawings in which I have shown the preferred embodiment of my invention, and in which like reference numerals indicate like parts throughout the several views thereof.

In the drawings,

Fig. 1 is a side view of my improved self-lubricating pressed steel ball bearing wheel.

Fig. 2 is a vertical sectional view thereof.

Fig. 3 is a part sectional view showing my improved wheel used as an idler roller for a conveyor belt.

Fig. 4 is an end view of the wheel proper without the pipe and end journal.

Fig. 5 is a view showing three idler rollers in proper relation for supporting a belt.

Referring now particularly to the drawings, the numeral 1 indicates a cast hub which is provided with a ball groove 2 in which a series of balls 3 are mounted, this hub is turned to a smaller diameter as shown at 4, to form a shoulder 4ª, the shank 5 being cast integral with the hub and the end 6 being threaded to receive a nut 7 in the usual manner.

The wheel comprises a pair of plates 8 and 9 respectively arranged in facial relation, and secured together by means of rivets 10 in the conventional manner, being rounded as shown at 11 to fit and receive a plurality of balls 3, and spaced apart as shown at 12 to form a grease or lubricant chamber directly adjacent the balls, said chamber being filled by means of a conventional alemite cup attachment 13 which communicates therewith.

The outer plate is flanged as shown at 14 to form a tread 15, the extreme edge 16 being bent at an angle to form a rim, the inner plate is also bent or flanged as shown at 17, the outer edge serving to reinforce and stiffen the tread 15, and this plate is further provided with a centrally disposed opening 18 through which the turned portion of the hub 1 extends, the edge of the plate being flanged as shown, a packing ring 19 (formed of felt or other suitable material) being interposed between the shoulder 4ª and the flanged portion of the plate and a thin metal washer 20 being mounted on the hub directly behind the felt ring to prevent the wearing thereof. This arrangement provides a lubricant tight joint which is also dust and dirt proof. The chamber 12 is also of ample capacity to hold a quantity of lubricant so that frequent lubrication is not necessary and leakage is eliminated.

A slightly different construction is shown in Figs. 3, 4 and 5 of the drawings, in this construction I use a pair of spaced apart wheels, and these are secured in a section of pipe 21 to form an idler such as are commonly used for belt conveyors. The cast hub is substantially the same excepting that it is bored to receive a shaft 22 which extends through the bearings 23 and both ends are threaded to receive nuts 24, both ends of the hub are also turned to form shoulders 4ª, and felt packing rings and washers are mounted on the said turned ends, also both plates 8 and 9 are formed identically alike, the outer turned flanges 25 being flat and are riveted to the pipe 21 by means of rivets 26. A spacer member 27 holding the members in proper spaced relation.

The outer edges of the hub 1 extend slightly beyond the outer edges of the plates 8 and 9, so that when the rollers are mounted at an angle as shown at 28 in Fig. 5, that the edges of the hub 1 will engage the edge of the bearing 23, this provides a very cheap and simple construction, and is extremely smooth in operation.

These stampings are of course heat treated and hardened insuring long life without wear or repair.

From the foregoing description it will be obvious that I have perfected a very simple, substantial and cheap pressed steel self-lubricated ball bearing wheel.

What I claim is:

1. A pressed steel wheel comprising a hub, a pair of plates of uniform thickness rigidly secured together in facial contact, and provided with centrally disposed openings adapted to receive said hub, the marginal edges of said openings being shaped to form a ball groove, a lubricant chamber surrounding and open to said ball groove, and a packing ring between said hub and plates to form a leak proof joint thereat.

2. A pressed steel wheel comprising a grooved hub, a pair of plates surrounding said hub and rigidly secured together in facial contact, the centers of said plates being pressed to shape to form a ball groove, a set of balls in said groove and held in position by said plates, said plates being spaced apart to form a lubricant chamber around said ball groove, and a felt packing ring between the hub and the inner edge of the plate to form a duct proof and oil tight joint thereat.

3. A pressed steel ball bearing wheel comprising a hub, a pair of plates rigidly secured together in facial contact, the outer edges of one plate being turned to form the wheel tread, the outer edge of the opposite plate being also turned to nest therein and reinforce said tread, a ball groove formed therein, said plate being shaped to form a lubricant chamber surrounding and open to said ball groove, and an oil and dust proof joint between the hub and the plates.

4. A pressed steel ball bearing wheel comprising a hub, a pair of plates rigidly secured together in facial contact, a ball groove formed in said plates, a lubricant chamber surrounding said ball groove and open thereto, means for introducing lubricant to said chamber, and a felt washer interposed between the hub and edges of the plate to form a dust and leak proof joint.

5. A pressed steel wheel comprising a hub, a pair of plates surrounding said hub and rigidly secured together in facial contact and having centrally disposed openings therein, the marginal edges of said plates being shaped to form a ball groove, a lubricant chamber surrounding and open to said ball groove, a shoulder on the hub, the inner edge of the plates surrounding said turned portion and a felt washer interposed between the shoulder and the edge of the plate.

6. A pressed steel wheel comprising a grooved hub, a pair of plates surrounding said hub and rigidly secured together in facial contact and provided with centrally disposed stamped openings therein, the marginal edges of said openings being shaped to form a ball groove, a lubricant chamber surrounding said groove and forming a continuation thereof, shoulders on the hub, a felt washer mounted thereon, and a metal washer interposed between the felt and turned edges of the plates.

7. A pressed steel ball bearing wheel comprising a hub, a pair of plates rigidly secured together in facial contact and surrounding said hub, the edge of the outer plate being bent to form the wheel tread, the edge of the inner plate being also shaped to nest therein and reinforce said tread, the central portion of the plates being spaced apart to form a lubricant chamber opening into a ball groove also formed in said plates, a shoulder on the hub, a felt washer mounted thereon, and a metal washer interposed between the felt washer and the turned edge of the plate to form a leak proof joint thereat.

8. A pressed steel wheel comprising a pair of stamped companion plates rigidly secured together in facial contact, the outer edge of one plate being turned to form the wheel tread, the outer edge of the opposite plate being also turned to nest in and reinforce the tread forming portion of the first mentioned plate.

In testimony whereof I affix my signature.

ALEXIS R. PRIBIL.